F. J. L. HAVERLAND, Jr.
AUXILIARY OILER FOR AUTOMOBILE ENGINES.
APPLICATION FILED FEB. 13, 1920.

1,362,486.

Patented Dec. 14, 1920.
2 SHEETS—SHEET 1.

F. J. L. HAVERLAND, Jr.
AUXILIARY OILER FOR AUTOMOBILE ENGINES.
APPLICATION FILED FEB. 13, 1920.

1,362,486.

Patented Dec. 14, 1920.
2 SHEETS—SHEET 2.

F. J. L. Haverland, Jr.
INVENTOR

BY Victor J. Evans
ATTORNEY

WITNESS:

UNITED STATES PATENT OFFICE.

FRANK J. L. HAVERLAND, JR., OF HUMPHREY, NEBRASKA.

AUXILIARY OILER FOR AUTOMOBILE-ENGINES.

1,362,486.

Specification of Letters Patent. Patented Dec. 14, 1920.

Application filed February 13, 1920. Serial No. 358,322.

*To all whom it may concern:*

Be it known that I, FRANK J. L. HAVERLAND, Jr., a citizen of the United States, residing at Humphrey, in the county of Platte and State of Nebraska, have invented new and useful Improvements in Auxiliary Oilers for Automobile-Engines, of which the following is a specification.

This invention relates to lubricating devices for automobile engines, particularly to a lubricating attachment adapted for use in connection with an automobile engine of a remarkably popular type which is lubricated merely by the splash system and in which the magneto magnets are carried by the fly-wheel and revoluble therewith in the oil contained within the transmission case, the transmission case being formed in one with the lower half of the crank case.

An important and more specific object is the provision of an attachment of this character which includes a tube leading into the crank case at the forward end thereof and connected with a peculiarly constructed hollow standard which takes the place of the ordinary magneto contact plug and which carries an equivalent contact member, the advantage of the device being that the oil thrown against the top of the transmission cover by centrifugal action caused by rotation of the fly-wheel and magnets, will be conducted by the tube to the forward end of the crank case so that a more efficient lubrication will be effected.

With the above and other objects and advantages in view, the invention consists in the details of construction to be hereinafter more fully described and claimed, and illustrated in the accompanying drawings in which—

Figure 1:
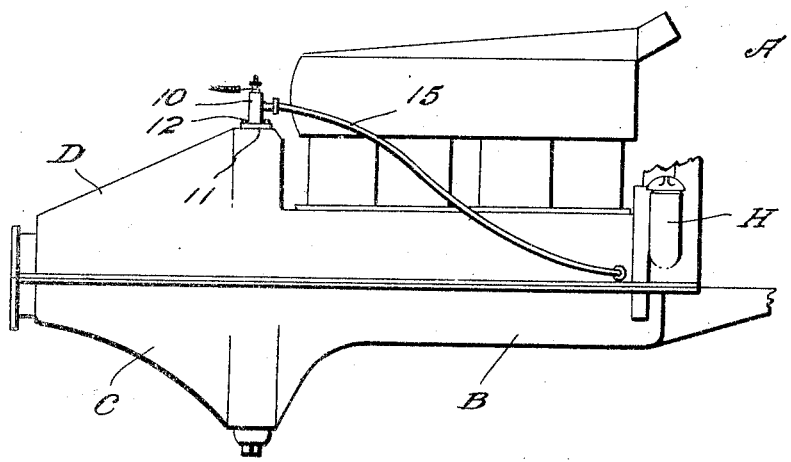
Figure 1 is a side elevation of an automobile engine of the Ford type, showing my device applied thereto.
Figure 3:
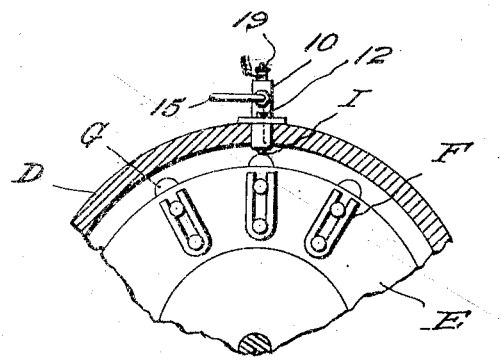
Fig. 3 is a cross sectional view taken at the point where the magneto contact point enters the transmission cover.
Figure 2:
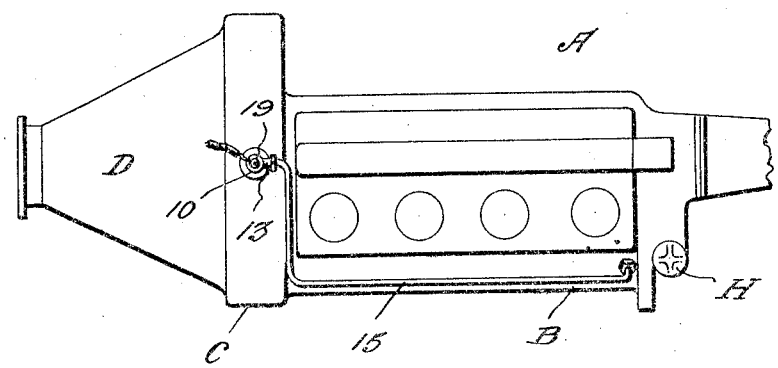
Fig. 2 is a plan view.
Figure 4:
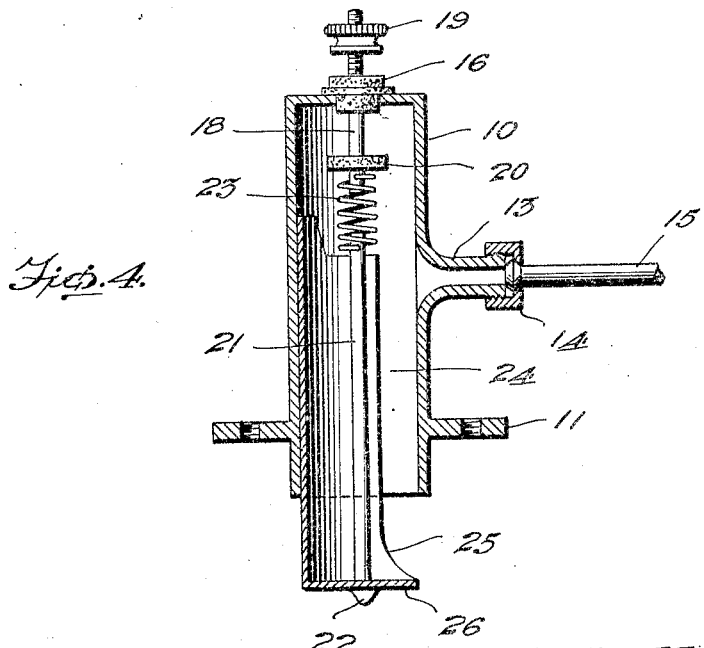
Fig. 4 is an enlarged longitudinal sectional view through the portion of my device which replaces the magneto contact point and which serves as the oil inlet to the auxiliary tube.

Referring more particularly to the drawings, the letter A designates a motor of the type specified, B designates the crank case, C designates the transmission case, and D designates the transmission case cover. The engine structure includes a rotary fly-wheel E which carries the magnets F which coöperate with the stationary magneto coils G. In a motor of this type there is ordinarily provided a contact member called the magneto contact plug which extends through the transmission cover D and which connects with one terminal of the stationary coils G, the contact member being connected with the ignition circuit of the motor. In an engine of this character the oil is fed into the crank case B through a breather pipe H at the forward end thereof, and the oil passes through the transmission case, a portion remaining therein and a portion overflowing into the transmission case C. The dip of the connecting rods into the oil within the crank case and the splash of the oil by the rotating fly-wheel and magnets provides the necessary lubrication. There is also ordinarily provided a tube which leads from near the fly-wheel to the time gears of the engine but it is a very frequent occurrence that this tube becomes clogged and improper lubrication at the forward end of the motor is the result.

In carrying out my invention I replace the ordinary magneto contact point, not shown, with a hollow shell 10 which is provided intermediate its ends with a flange 11 through which pass screws 12 for securing the device upon the transmission cover, the screws 12 passing into the holes therein. At one side this shell 10 is provided with a nipple 13 with which is connected, by means of a coupling 14, a tube 15 which is disposed exteriorly of the motor and which has its other end leading into the crank case beneath number one cylinder.

Secured within the top of the casing or shell 10 is a plug 16 of insulating material and extending through this plug is a rod 18 carrying a nut 19 by means of which the ignition feed wire of the motor may be connected with my structure. Disposed within the lower portion of the shell 10 and slidable therein is a member 20 also of insulating material through which extends a rod 21 secured thereto and terminating below the lower end of the member 20 in a tapered contact point 22 engaging the member I constituting one terminal of the magneto coils G. The rod 21 extends above the upper end of the member 20 and is connected with a coil spring 23 which is also connected with the lower end of the rod 18. The spring 23 thus serves as an electrical connection between the rods 18 and 21 while permitting movement of the member 20 under the influence of the spring. The member 20 does not occupy the entire interior of the lower portion of the shell 10 so that the space 24 is left, forming an oil conduit leading to the nipple 13. The lower end of the member 20 is cut away on a curve, as shown at 25, whereby to provide a lip 26.

In the operation of the device it will be seen that the oil thrown outwardly by the fly-wheel and magnets will, upon striking the lip 26, be deflected upwardly through the channel 24 and out through the nipple 13 and into the tube 15 whence it will pass into the forward part of the crank case. It will be observed that this action in no way interferes with the action of the magneto contact but simply serves to circulate the oil thoroughly from one end of the engine to the other.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with the crank case and transmission case of an internal combustion motor including a fly-wheel rotating in the transmission case and carrying magnet, the motor further including stationary magneto coils located within the transmission case; an auxiliary oiling device comprising a shell secured upon and extending into the transmission case and replacing the ordinary magneto contact point, a nipple on one side of said shell, a tube connected with said nipple and leading into the forward end of the crank case, and a slidable spring-pressed metallic contact disposed within and insulated from said shell and engaging one terminal of the magneto coils.

2. In combination with the crank case and transmission case of an internal combustion motor, the motor including a fly-wheel and magnets carried thereby and further including stationary magneto coils located within the transmission case, a lubricating device comprising a shell secured upon and extending into the transmission cover and replacing the ordinary magneto contact point, a tube connected with said shell intermediate its ends and leading into the forward end of the crank case, a metallic contact member disposed within and insulated from the upper portion of said shell, an insulating member slidable within the lower portion of said shell and extending beyond the lower end thereof, said slidable member being of less width than the internal diameter of the shell whereby to provide an oil conducting channel leading to said tube, a metallic contact member extending through and beyond both ends of said slidable member and engaging one terminal of the magneto coils, and a spring interposed between said metallic contact members and normally urging said slidable member downwardly.

FRANK J. L. HAVERLAND, Jr.